(12) United States Patent
Cacciola

(10) Patent No.: US 10,724,527 B2
(45) Date of Patent: Jul. 28, 2020

(54) LIQUID SENSING SWITCH

(71) Applicant: Bilge Sense LLC, Newport, RI (US)

(72) Inventor: John Cacciola, Severn, MD (US)

(73) Assignee: Bilge Sense LLC, Newport, RI (US)

( * ) Notice: Subject to any disclaimer, the term of this patent is extended or adjusted under 35 U.S.C. 154(b) by 0 days.

(21) Appl. No.: 15/988,240

(22) Filed: May 24, 2018

(65) Prior Publication Data

US 2018/0340539 A1 Nov. 29, 2018

Related U.S. Application Data

(60) Provisional application No. 62/510,575, filed on May 24, 2017.

(51) Int. Cl.
| | |
|---|---|
| *F04D 15/02* | (2006.01) |
| *F04D 13/06* | (2006.01) |
| *G05D 9/12* | (2006.01) |
| *B63B 13/00* | (2006.01) |
| *B63B 49/00* | (2006.01) |
| *B63J 4/00* | (2006.01) |
| *B63B 45/00* | (2006.01) |

(52) U.S. Cl.
CPC .......... *F04D 15/0218* (2013.01); *B63B 13/00* (2013.01); *B63B 49/00* (2013.01); *B63J 4/002* (2013.01); *F04D 13/0686* (2013.01); *G05D 9/12* (2013.01); *B63B 2045/005* (2013.01)

(58) Field of Classification Search
CPC .. F04D 15/0218; F04D 13/0686; B63J 4/002; B63B 13/00; B63B 49/00; B63B 2045/005; G05D 9/12
See application file for complete search history.

(56) References Cited

U.S. PATENT DOCUMENTS

| 2,426,252 A | * | 8/1947 | Thomson | G01F 23/263 |
| | | | | 174/152 R |
| 2,468,791 A | * | 5/1949 | Thomson | G01N 27/06 |
| | | | | 137/392 |
| 3,787,733 A | * | 1/1974 | Peters | G05D 9/12 |
| | | | | 137/392 |
| 3,916,213 A | * | 10/1975 | Luteran | G01F 23/244 |
| | | | | 137/392 |
| 3,978,352 A | * | 8/1976 | Rose | H03K 3/3525 |
| | | | | 307/116 |
| 4,061,442 A | * | 12/1977 | Clark | G05D 9/12 |
| | | | | 417/36 |

(Continued)

FOREIGN PATENT DOCUMENTS

GB 2248939 A 4/1992

OTHER PUBLICATIONS

International Search Report and Written Opinion issued in connection with corresponding International Application No. PCT/US18/34326 dated Sep. 25, 2018.

*Primary Examiner* — Charles G Freay
(74) *Attorney, Agent, or Firm* — Womble Bond Dickinson (US) LLP; John J. Penny, Jr.

(57) ABSTRACT

A liquid sensing switch comprising an upper sensor plate linked to electronics, a lower sensor plate linked to the electronics, and a ground linked to the electronics, wherein a pump is activated when a liquid level rises above a position of the lower sensor plate and above a position of the upper sensor plate, causing a current to pass between the two sensor plates.

9 Claims, 6 Drawing Sheets

(56) References Cited

U.S. PATENT DOCUMENTS

| | | | | |
|---|---|---|---|---|
| 4,171,932 A | * | 10/1979 | Miller | F04D 15/0218 |
| | | | | 307/118 |
| 4,357,131 A | * | 11/1982 | Guillemot | F04B 49/02 |
| | | | | 417/12 |
| 4,468,546 A | | 8/1984 | Jones | |
| 4,600,844 A | * | 7/1986 | Atkins | G05D 9/12 |
| | | | | 137/392 |
| 4,678,403 A | | 7/1987 | Rudy et al. | |
| 4,788,861 A | * | 12/1988 | Lichti | B41J 2/17566 |
| | | | | 141/95 |
| 4,881,873 A | | 11/1989 | Smith et al. | |
| 5,145,323 A | * | 9/1992 | Farr | F04B 49/025 |
| | | | | 417/18 |
| 5,196,729 A | * | 3/1993 | Thorngren | F25D 21/02 |
| | | | | 307/118 |
| 5,297,939 A | | 3/1994 | Orth et al. | |
| 5,404,048 A | | 4/1995 | Panner | |
| 5,425,624 A | | 6/1995 | Williams | |
| 5,719,556 A | * | 2/1998 | Albin | G01F 23/265 |
| | | | | 340/618 |
| 5,856,783 A | * | 1/1999 | Gibb | B67D 7/766 |
| | | | | 324/660 |
| 6,106,087 A | * | 8/2000 | Kishi | B41J 2/17566 |
| | | | | 118/694 |
| 6,218,948 B1 | | 4/2001 | Dana | |
| 6,236,324 B1 | | 5/2001 | Nash | |
| 7,373,817 B2 | | 5/2008 | Burdi et al. | |
| 7,629,800 B2 | * | 12/2009 | Parachini | G01F 23/243 |
| | | | | 324/691 |
| 9,410,545 B2 | | 8/2016 | Nirenberg | |
| 2011/0110794 A1 | | 5/2011 | Mayleben et al. | |
| 2016/0146656 A1 | | 5/2016 | Hoppe et al. | |

* cited by examiner

LIQUID SENSING SWITCH

BACKGROUND OF THE INVENTION

This present invention relates generally to boats and other water craft or vessels, and more particularly to a liquid sensing sensor for detecting bilge.

In general, most boats, regardless of the material or construction and fabrication, have a tendency to take on a certain amount of water when floating in a body of water. For the most part, water entering a boat hull tends to accumulate in the lower portion of the hull usually referred to as the "bilge." While small amounts of water within the bilge of a boat is a tolerable and generally common condition, extensive water collection within a bilge of a boat hull is extremely undesirable and may, if left unattended, prove dangerous or even catastrophic.

Bilge pumps are typically used to pump excess water from the bilge. In general, a bilge pump switch, activates and deactivates a bilge pump in response to predetermined water levels in the bilge. However, in the past, bilge pump switches have been unreliable mechanical "float-type" switches that stick causing the bilge pump to remain "on" or remain "off". Electronic switches, while having no moving parts, exhibited the same issues, i.e., they either "stick on," keeping the bilge pump running indefinitely due to a high conductivity of soapy water used to clean a vessel, or never turn the pump on, due to low conductivity which comes as the result of oil mixed with water commonly found in the bilge.

What is needed is a liquid sensing switch that overcomes the shortcomings pointed out above.

SUMMARY

At least one embodiment of the present invention is directed towards a liquid sensing switch, such as a bilge pump switch, that is used to control a bilge pump.

The liquid sensing switch of at least one embodiment of the present invention comprised bilge water level sensing using Radio Frequency (RF), analog and digital circuits.

The liquid sensing switch of at least one embodiment of the present invention comprises all metallic elements which touch bilge water being constructed of bare uninsulated stainless steel and their mechanical placement is critical to meeting design goals.

The liquid sensing switch of at least one embodiment of the present invention comprises two horizontal large surface area bare stainless steel sensor plates, one spaced above the other by a distance of approximately 0.75 inches (in.), to provide input to detector circuits. When both horizontal bare stainless steel sensor plates are covered, a bilge pump is activated. When both horizontal bare stainless steel sensor plates are uncovered, the bilge pump is deactivated.

The liquid sensing switch of at least one embodiment of the present invention comprises two sensor plates driven by a 20 KHz square wave. When both sensor plates are covered with bilge water a bilge pump turns on. When both sensor plate are uncovered the bilge pump turns off. Each sensor plate drives a peak detector and comprises the placement of a diode load resistor which is formed by a resistor in series with an emitter base junction of an NPN transistor. The two peak detectors drive a NAND gate wired in set/reset mode. An output from the set/reset circuit drives a transistor which in turn drives a relay to handle the high current required by a bilge pump (20A).

The liquid sensing switch of at least one embodiment of the present invention comprises an upper sensor plate linked to electronics, a lower sensor plate linked to the electronics, and a ground linked to the electronics, wherein a pump is activated when a liquid level rises above a position of the lower sensor plate and above a position of the upper sensor plate, causing a current to pass between the two sensor plates.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein.

DETAILED DESCRIPTION

Figure 1:
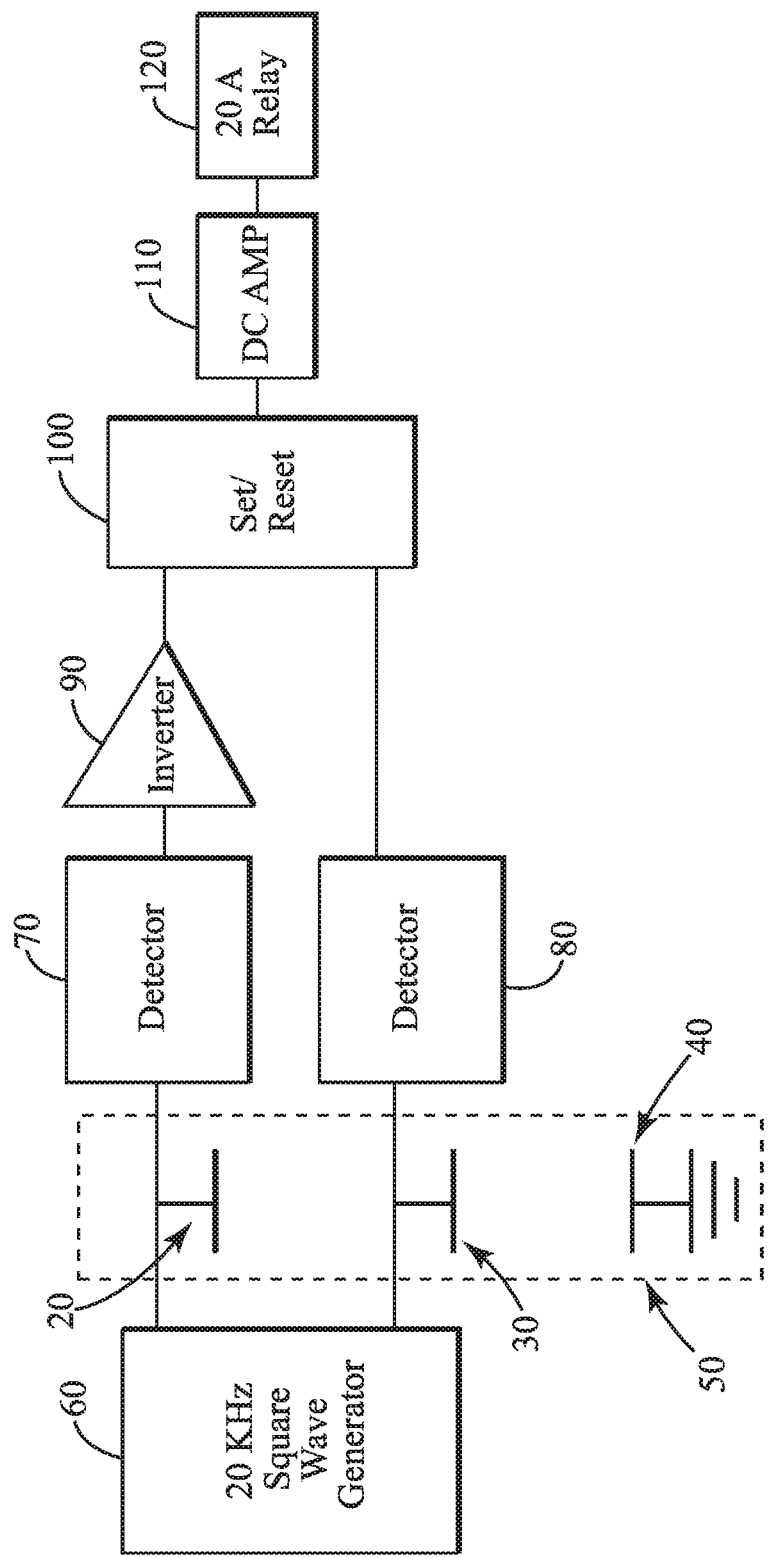
FIG. 1 is a block diagram of an exemplary embodiment of a bilge pump switch in accordance with the principles of the present invention.

The subject innovation is now described with reference to the drawings, wherein like reference numerals are used to refer to like elements throughout. In the following description, for purposes of explanation, numerals specific details are set forth in order to provide a thorough understanding of the present invention. It may be evident, however, that the present invention may be practiced without these specific details. In other instances, well-known structures and devices are shown in block diagram form in order to facilitate describing the present invention.

As shown in FIG. 1, an exemplary liquid sensing switch 10, also referred to as a bilge pump switch, includes a large surface area upper bare uninsulated stainless steel sensor plate 20, a large surface area lower bare uninsulated stainless steel sensor plate 30 and a large surface area ground plate 40. Stainless steel can be used to prevent corrosion. A dotted line illustrates an area 50 that comes in contact with bilge water. The upper bare uninsulated stainless steel sensor plate 20, the lower bare uninsulated stainless steel sensor plate 30 and the ground plate 40 are located within the area 50. A 20 KHz square wave generator is linked to the upper plate 20 and the lower plate 30. The upper sensor plate 20 is connected to a detector 70 and the lower sensor plate 30 is connected to a detector 80. The detector 70 is connected to an inverter 90. The inverter 90 and the detector 80 are connected to a set/reset circuit 100, which in turn is connected to a DC amplifier (AMP) 110 and a 20 amp (A) relay 120. The inverter 90 is required between the detector 70 for the upper bare uninsulated stainless steel sensor plate 20 since the set/reset circuit 100 changes state on a negative transition of its input signals. The detector 70 transitions to positive when the upper plate 20 comes in contact with liquid. Inversion is not required for the lower bare stainless steel sensor plate 30 since uncovering the lower bare stainless steel sensor plate 30 transitions a voltage to negative.

The liquid sensing switch 10 can use oil in a bilge liquid as a dielectric of a capacitor. A second plate of the capacitor is formed when liquid surrounds the plate. This causes the plate to go from open circuit when uncovered to low impedance when covered, changing the drive level into a peak detector. When pure fuel covers the plate, the sensor appears as an open circuit. If no oil is in the water the sensor plates form a simple resistance to ground when covered. The peak detector output is sufficient to drive the set/reset circuit 100 input from the lower sensor plate 30 directly. The upper sensor plate 20 requires the use of a transistor inverter to provide the correct sense to drive the set/reset circuit 100.

Figure 2:
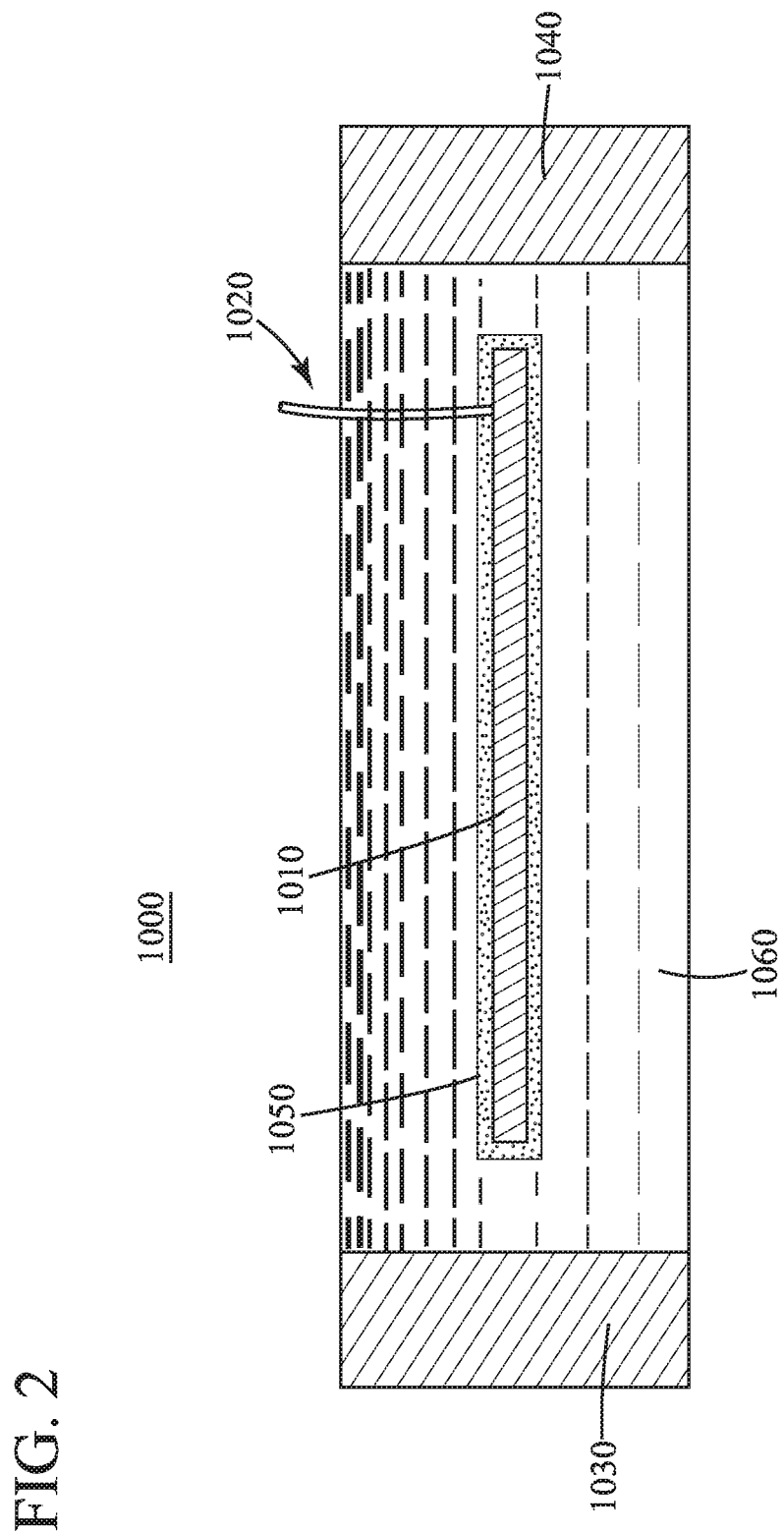
FIG. 2 is a block diagram of a single plate capacitor pictorial.

As shown in FIG. 2, a single plate capacitor 1000 includes a bare uninsulated stainless steel sensor plate 1010 having a connection 1020 to electronics (not shown). The single plate capacitor 1000 includes a ground plate 1030 and a ground plate 1040.

Bilge can include various materials. In the present invention, when bilge contains salty/brackish water, soapy water or fresh water, the bare uninsulated stainless steel sensor plate 1010 becomes a resistor to ground. When the bilge contains an oil/fuel/water mixture, the bare uninsulated stainless steel sensor plate 1010 becomes a capacitor. When the bilge contains pure fuel, the bare uninsulated stainless steel sensor plate 1010 will not conduct and the switch will not activate a bilge pump.

In FIG. 2, the bare stainless steel sensor plate 1010 is shown coated with an occluded oil film 1050 and immersed in fluid 1060. The oil coating of the plates forms a dielectric and the liquid surrounding the plate 1010 acts as a "second plate". When the fluid 1060 is a bilge water based liquid, the bare stainless steel sensor plate 1010 causes a bilge pump to run. When the fluid 1060 is pure fuel the bare stainless steel sensor plate 1010 will not cause the bilge pump to run.

The bare stainless steel sensor plate 1010 has a relatively large surface area (e.g., four square inches) of non-insulated stainless steel. This design yields the impedance required to respond to oily water and reject soapy water. The plate 1010 can be folded back on itself or two sections can be welded or bolted together to maintain the four inch surface area while reducing the footprint. The single plate can be circular or square.

Figure 3:
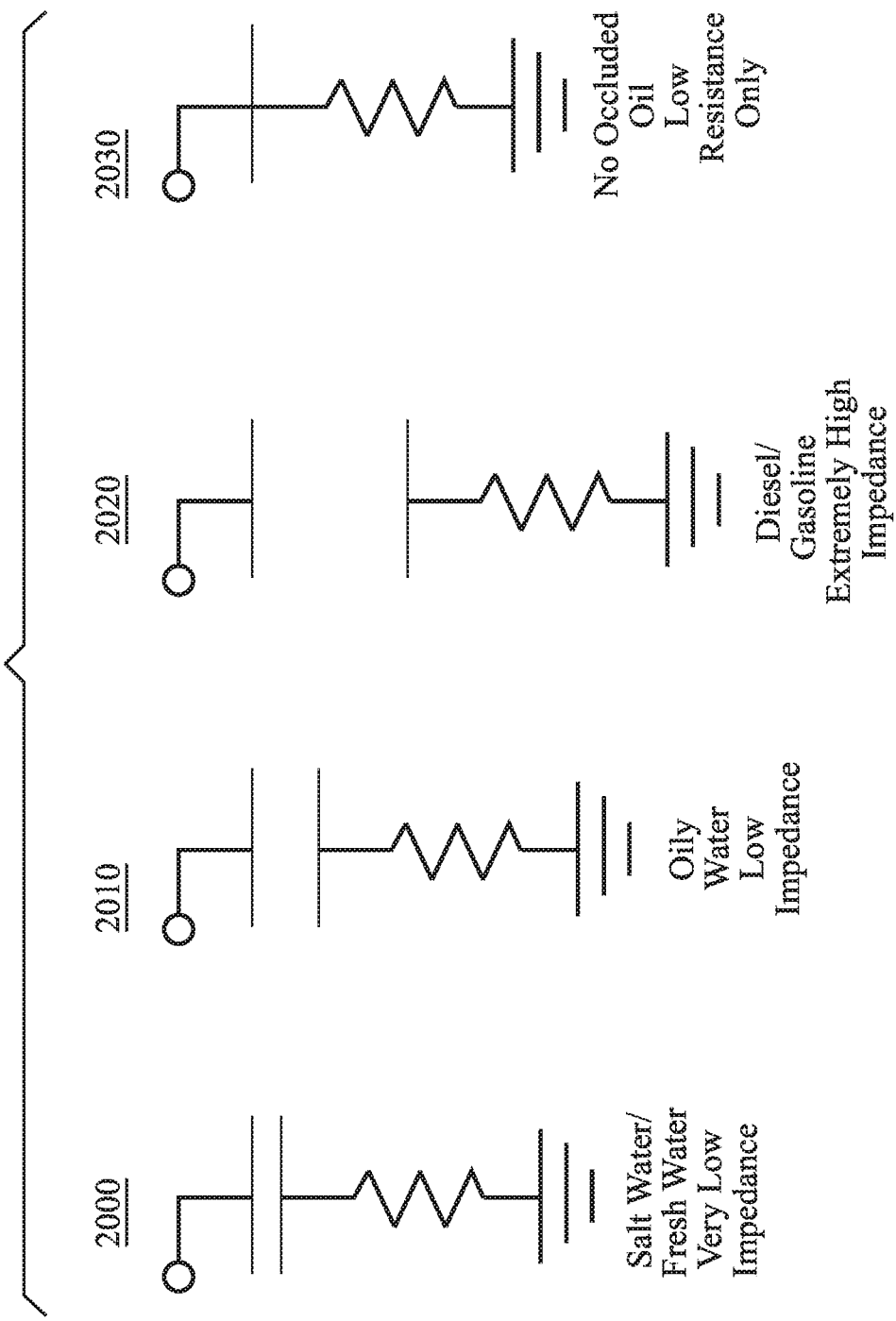
FIG. 3 is a block diagram of several sensor equivalent plates.

FIG. 3 illustrates several sensor equivalent plates 2000, 2010, 2020, 2030 driven by a 20 KHz square wave generator wherein the lightly colored plates are distributed. A frequency of 1 KHz-20 KHz also can be used.

Figure 4:
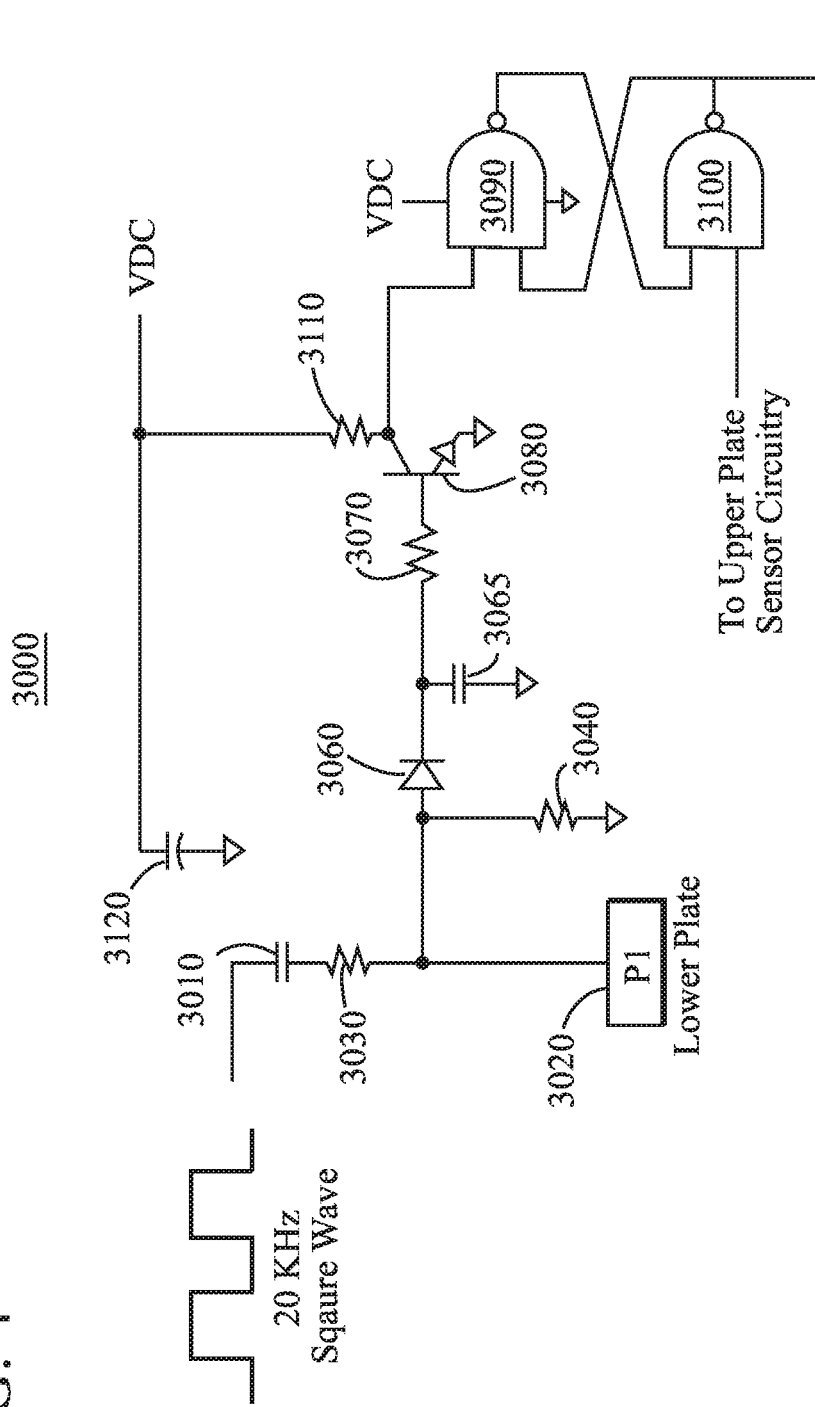
FIG. 4 is an exemplary schematic wiring diagram of sensor circuitry in accordance with the principles of the present invention.

As shown in FIG. 4, the electric circuitry 3000 of an exemplary liquid sensing switch includes a capacitor 3010 electrically connected to a lower plate 3020 through a resistor 3030. In one embodiment, the capacitor 3010 is a 10 microfarads (uF) capacitor and the resistor 3030 is an 11K ohm resistor.

The circuitry 3000 includes a 10K resistor 3040 going to a ground 3050. The circuitry 3000 includes diode 3060 going to ground, a capacitor 3065 and a resistor 3070, such as a 1M ohm resistor, with current entering a base of a NPN transistor 3080. An emitter current of the NPN transistor 3080 flows to ground while a collector current flows towards two NAND gates 3090, 3100. Collector current also flows through a resistor 3110, such as a 500K ohm resistor, to ground through a capacitor 3120, such as a 10 uF capacitor. Current from upper plate circuitry (not shown) enters NAND gate 3100.

Figure 5:
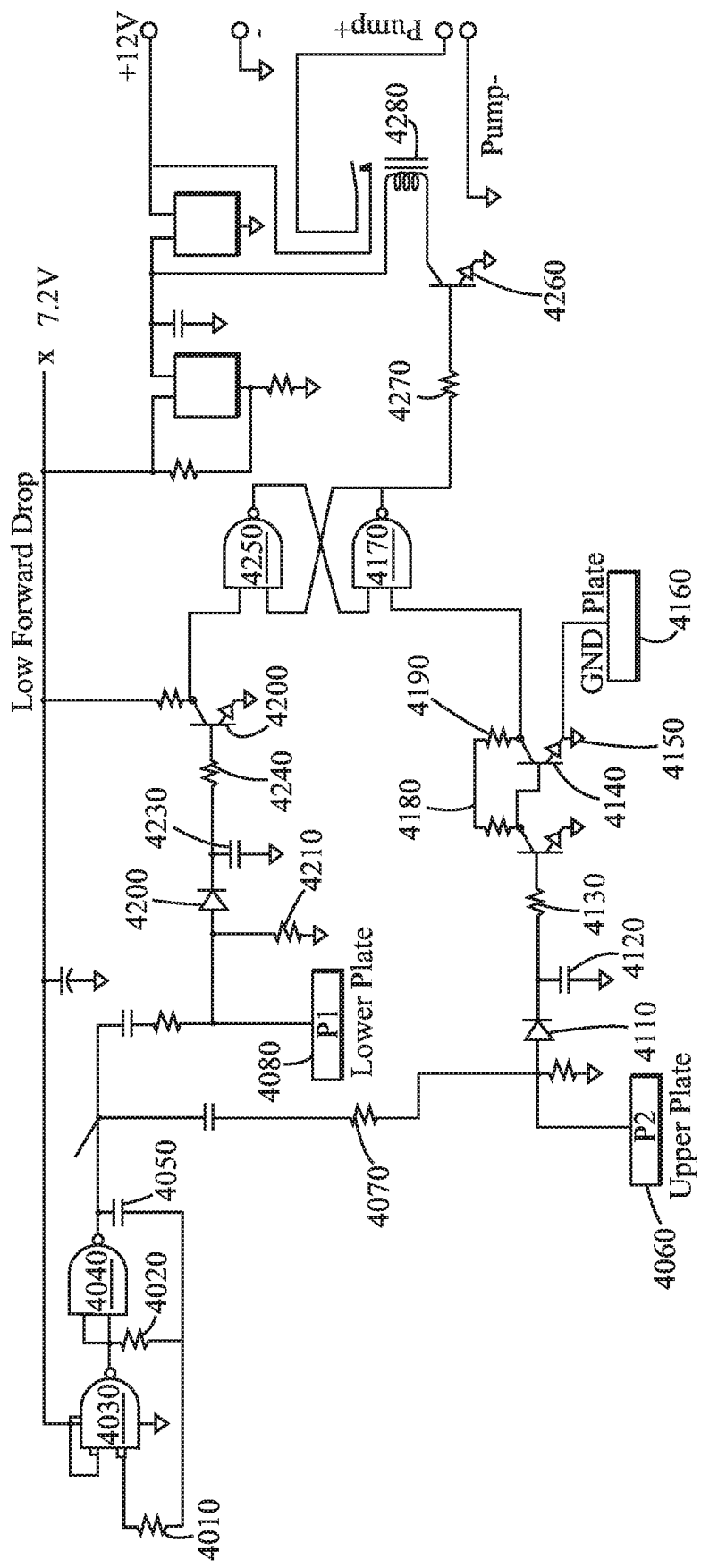
FIG. 5 is an exemplary schematic wiring diagram of a bilge switch in accordance with the principles of the present invention.

As shown in FIG. 5, the electric circuitry of a bilge pump switch 4000 includes resistors 4010, 4020, NAND gates 4030, 4040, and capacitor 4050 providing current to an upper plate 4060 through a resistor 4070, and to a lower plate 4080 through a capacitor 4090 and resistor 4100. Current flows through a line from the upper plate 4060 and includes a diode 4110, capacitor 4120 and resistor 4130. This current is provided to a base of NPN transistor 4140. An emitter current of the NPN transistor 4140 goes to ground while collector current flows to a base of NPN transistor 4150. An emitter current of NPN transistor 4150 goes to a ground plate 4160 while a collector current flows to a NAND gate 4170 protected by two resistors 4180, 4190.

Current flows through a line from the lower plate 4080 to a base of a NPN transistor 4200 through a resistor 4210, a diode 4220, a capacitor 4230 and a resistor 4240. Emitter current of the NPN transistor 4200 goes to ground while a collector current goes to a NAND gate 4250.

Current from the NAND gate 4170 flows to a base of a NPN transistor 4260 through a resistor 4270. An emitter current of the NPN transistor 4170 goes to ground while collector current flows to an inductor 4280.

Figure 6:
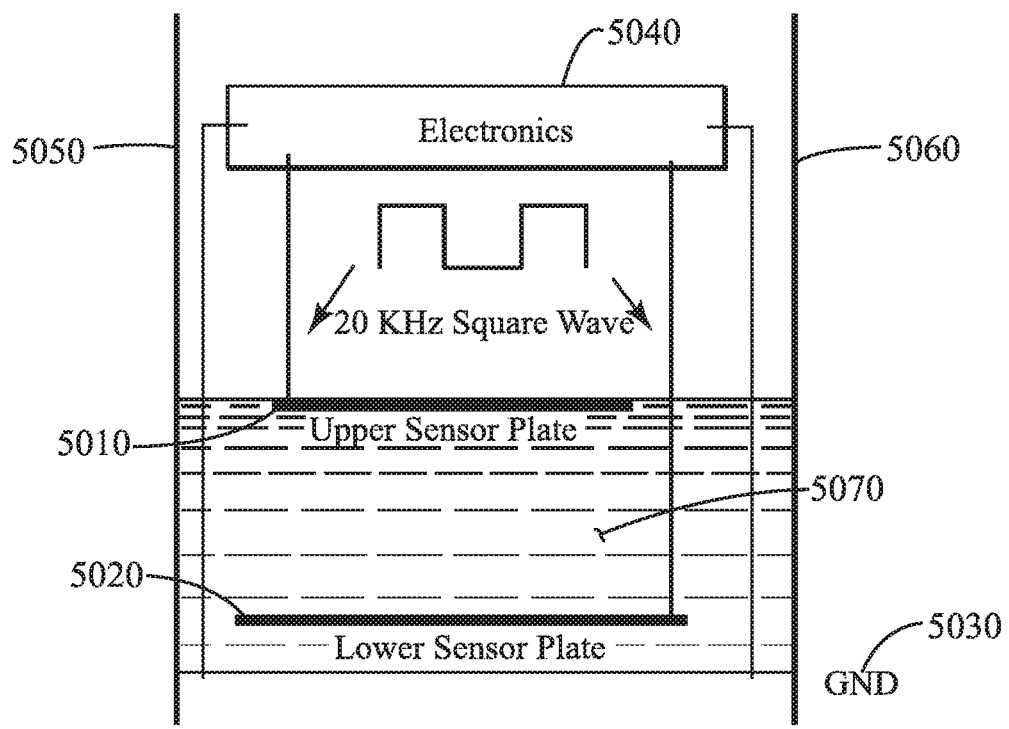
FIG. 6 is a block diagram of a bilge switch environment.

FIG. 6 illustrates a bilge switch system 5000 that includes a large surface area upper bare 8743 uninsulated stainless steel sensor plate 5010, a large surface area lower bare uninsulated stainless steel sensor plate 5020 and a ground 5030. The upper bare uninsulated stainless steel sensor plate 5010 and lower bare uninsulated stainless steel sensor plate 5020 are linked to electronics 5040, which in turn has a connection to ground 5030. The upper bare stainless steel sensor plate 5010 and lower bare stainless steel sensor plate 5020 are located within walls 5050, 5060, such that bilge liquid 5070 is contained within the walls 5050, 5060. In a preferred embodiment, the bare stainless steel sensor plates 5010, 5020 are positioned at least 0.2 inches away from the walls 5050, 5060 to prevent the bilge switch system 5000 from sticking. In a preferred embodiment, the lower bare stainless steel sensor plate 5020 is separated from the ground 5030 by at least a distance of 0.5 inches. In a preferred embodiment, the upper bare stainless steel sensor plate 5010 and the lower bare stainless steel sensor plate 5020 are separated by at least a distance of 0.75 inches.

A level 5080 of bilge liquid 5070 rises and falls within the walls 5050, 5060. As the level 5080 rises, it covers the lower bare stainless steel sensor plate 5020 first and the upper bare stainless steel sensor plate 5010 second. Once both bare stainless steel sensor plates 5010, 5020 are immersed in bilge liquid 5070, current runs between the plates 5010, 5020 and activates a bilge pump (not shown). As the bilge pump removes bilge liquid 5070, the bilge switch system 5000 continues to energize the bilge pump until the bilge liquid 5070 breaks contact with the lower bare stainless steel sensor plate 5020, and thus stopping the bilge pump. Bilge liquid 5070 can remain in contact with the lower bare stainless steel sensor plate 5020 for about a distance of 0.25 inches below the bilge water level 5080 in soapy water.

The sensor plates described herein also can be insulated plates, and can be made of other conductors such as aluminum, other metals, etc.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A system comprising:
   a pump;
   a liquid sensing switch linked to the pump and suspended in an area, the liquid sensing switch comprising:
   a large surface area upper bare uninsulated stainless steel sensor plate linked to electronics;
   a large surface area lower bare uninsulated stainless steel sensor plate linked to the electronics; and
   a large surface area ground linked to the electronics, wherein
   the pump is activated when a liquid level in the area rises above a position of the lower bare uninsulated stainless steel sensor plate and above a position of the upper bare uninsulated stainless steel sensor plate.

2. The system of claim 1 wherein a distance between the position of the upper bare uninsulated stainless steel sensor plate and the position of the lower bare uninsulated stainless steel sensor plate is approximately 0.75 inches.

3. The system of claim 1 wherein the upper bare uninsulated stainless steel sensor plate and the lower bare uninsulated stainless steel sensor plate are positioned between walls in the area.

4. The system of claim 3 wherein the upper bare uninsulated stainless steel sensor plate and the lower bare uninsulated stainless steel sensor plate are positioned approximately 0.2 inches from the walls in the area.

5. The liquid sensing switch of claim 1, wherein the lower sensor plate is separated from the ground by approximately 0.5 inches.

6. A liquid sensing switch comprising:
   a 20 KHz square generator;
   an upper bare stainless steel sensor plate, a lower bare stainless steel sensor plate and a ground contained in an area that comes in contact with a liquid;
   a first detector linked to the 20 KHz square generator and the upper bare stainless steel sensor plate;
   a second detector linked to the 20 KHz square generator and the lower bare stainless steel sensor plate;
   an inverter linked to the first detector; and
   a set/reset circuit receiving input from the inverter and the second detector and providing input to a DC amplifier linked to a 20 amp relay.

7. The liquid sensing switch of claim 6 wherein the inverter is positioned in response to the set/reset circuit changing state on a negative transition of input signals of the set/reset circuit.

8. A liquid sensing switch linked to a pump and suspended in an area, the liquid sensing switch comprising:
   a large surface area upper bare uninsulated stainless steel sensor plate linked to electronics;
   a large surface area lower bare uninsulated stainless steel sensor plate linked to the electronics; and
   a large surface area ground linked to the electronics, wherein
   the pump is activated when a liquid level in the area rises above a position of the lower bare uninsulated stainless steel sensor plate and above a position of the upper bare uninsulated stainless steel sensor plate.

9. A liquid sensing switch configured to be linked to a pump, the liquid sensing switch comprising:
   an upper sensor plate linked to electronics;
   a lower sensor plate linked to the electronics; and
   at least one ground plate, wherein when the upper sensor plate is covered by bilge containing substantially water, the liquid sensing switch generates a signal capable of activating the pump and when the upper sensor plate is covered by bilge containing substantially fuel, the pump is not activated, and wherein the upper and lower sensor plate each have an area of approximately four square inches.

* * * * *